United States Patent

Johnson et al.

[15] 3,703,681
[45] Nov. 21, 1972

[54] THIN FILM LINE SENSOR FOR MEASURING MAGNETIC FIELDS, PRESSURE, VIBRATION OR PHYSICAL DISPLACEMENT

[72] Inventors: Gary N. Johnson, Rapid City, S. Dak.; Larry E. Wilson, Excelsior, Minn.

[73] Assignee: Honeywell Inc., Minneapolis, Minn.

[22] Filed: May 14, 1971

[21] Appl. No.: 143,548

[52] U.S. Cl. ..............................324/43 R, 73/517 R
[51] Int. Cl. .............................................G01r 33/02
[58] Field of Search ..............324/43 R, 47; 73/517 R

[56] References Cited

UNITED STATES PATENTS

| 2,643,367 | 6/1953 | Cruzan | 73/517 R |
| 2,841,386 | 7/1958 | Everett | 73/517 R |
| 3,239,754 | 3/1966 | Odom, Jr. et al. | 324/47 |
| 3,490,034 | 1/1970 | Marshall, Jr. | 324/43 R |

Primary Examiner—Robert J. Corcoran
Attorney—Charles J. Ungemach and Albin Medved

[57] ABSTRACT

A line sensor which utilizes a ferromagnetic coated conductor in combination with another conductor in a line transducer. The line sensor is responsive to stress and to the ambient magnetic field. The impedance of the line transducer varies in accordance with the stress thereon and also in accordance with changes in the ambient magnetic field. A driving signal is introduced into the line transducer and a monitoring circuit detects the variations in the impedance of the line transducer. This enables the line sensor to indicate either individually or in combination disturbances in the ambient magnetic field, seismic movement, and differential displacement of the line transducer due to pressure upon the medium containing the line transducer.

10 Claims, 6 Drawing Figures

PATENTED NOV 21 1972 3,703,681

INVENTORS
GARY N. JOHNSON
LARRY E. WILSON
BY
ATTORNEY

INVENTORS
GARY N. JOHNSON
LARRY E. WILSON
BY
ATTORNEY

THIN FILM LINE SENSOR FOR MEASURING MAGNETIC FIELDS, PRESSURE, VIBRATION OR PHYSICAL DISPLACEMENT

BACKGROUND OF THE INVENTION

The present invention is an improvement in magnetic, pressure, and seismic line sensors.

The ease of deployment and continuous sensitivity of the line sensor make it useful in security applications and in research and exploration. Commonly known pressure and seismic line sensors employ fluid filled lines, resistance-type lines, capacitive-type lines, or lines containing a combination of permanent magnets and coils. The present line sensor is constructed in the manner of a coaxial transmission line, thereby eliminating the use of fluids, coils, and separated conducting plates. This allows the present line sensor to be constructed and deployed with less difficulty than is experienced with existing line sensors. Also, due to the simplified construction, the present line sensor has increased reliability.

Furthermore, commonly known line sensors are not responsive to inputs of more than one type as is possible with the present line sensor which may be constructed to be responsive to magnetic fluctuations, seismic disturbances, or pressure inputs. Such multiple sensitivity makes the present line sensor valuable in security applications where it is desired to monitor the movement of ferromagnetic masses as well as the presence of pressure or vibration.

BRIEF SUMMARY OF THE INVENTION

The present invention employs a ferromagnetic coated conductor in a line transducer for sensing magnetic and environmental disturbances either individually or in combination. A wirelike conductor has a ferromagnetic coating thereon which has a net magnetization vector about the conductor for sensing magnetic disturbances and which is magnetostrictive for sensing physical environmental disturbances. A second conductor encloses the coated conductor for its entire length and an insulating material separates the two conductors.

The two conductors are connected to a monitoring circuit and also to an oscillator which causes the magnetization vector to oscillate about its predisposed orientation. A variation in the ambient magnetic field causes further disorientation of the vector which causes the inductive impedance of the coated conductor to vary accordingly. This variation in impedance is detected by the monitoring circuit.

The magnetostrictive character of the ferromagnetic coating results in a similar variation in the inductive impedance in accordance with the strain imposed upon the coated conductor. This feature allows the line sensor to be responsive to strain within the line transducer caused by either static or dynamic pressure or physical movement.

The objective of the present invention is to provide an improved line sensor that is responsive to the ambient magnetic field.

Another objective is to provide an improved line sensor that is responsive to displacement of the line transducer.

A further objective is to provide an improved line sensor that is responsive to seismic movement.

Still another objective is to provide a line sensor that is responsive to a combination of the above inputs.

DESCRIPTION OF THE PREFERRED EMBODIMENT

Figure 1:
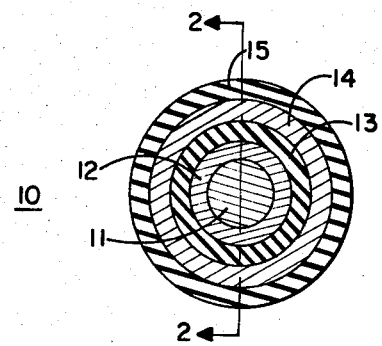
FIG. 1 is a cross section view of one embodiment of the line transducer in the line sensor.
Figure 2:
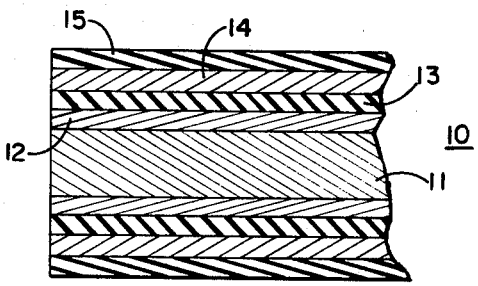
FIG. 2 is a cross section view of the line transducer of FIG. 1 taken along the line 2—2 of FIG. 1.

Referring to FIGS. 1 and 2 a line transducer 10 of the line sensor contains a beryllium copper conductor 11 which has a ferromagnetic coating 12 applied thereon. Ferromagnetic coating 12 is a nickel-iron alloy which is approximately 20 percent iron and 80 percent nickel. Ferromagnetic coating 12 has a net magnetization vector which results from the application of a constant magnetic field about conductor 11 during the plating of ferromagnetic coating 12 thereon. A second conductor 14 encloses conductor 11 and is separated therefrom by an insulating material 13. A protective covering 15 protects the exterior of second conductor 14.

Figure 6:
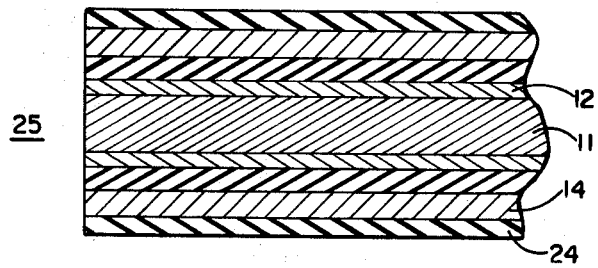
FIG. 6 is a cross section view of a fourth embodiment of the line transducer.

FIG. 6 shows a line transducer 25 that differs from line transducer 10 only because conductor 14 does not enclose conductor 11. In line transducer 25, conductors 11 and 14 are substantially parallel and separated by an insulating material 24 that also serves as a protective covering.

Figure 3:
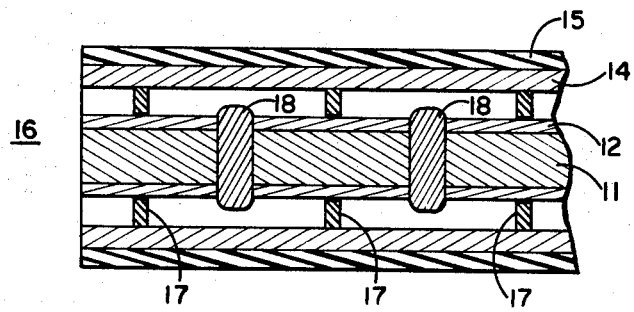
FIG. 3 is a cross section view of a second embodiment of the line transducer in the line sensor.

FIG. 3 shows a line transducer 16 which is identical to line transducer 10 except that conductor 11 is separated from second conductor 14 by a plurality of equally spaced circular nonconducting spacers 17. A plurality of small masses 18 are attached to conductor 11 equidistant between successive spacers 17.

Figure 5:
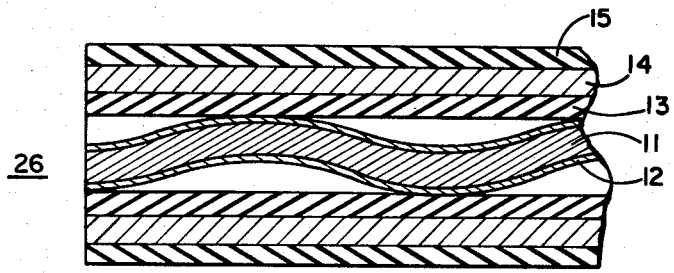
FIG. 5 is a cross section view of a third embodiment of the line transducer.

FIG. 5 shows a line transducer 26 that is identical to line transducer 10 except that the cavity within insulating material 13 has a greater diameter than conductor 11 with its ferromagnetic coating 12. Therefore, conductor 11 is not tightly bound and has intervals of non-contact with insulating material 13.

Figure 4:
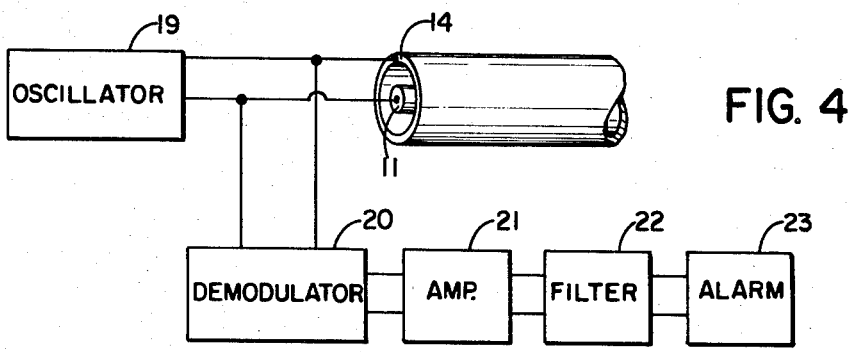
FIG. 4 shows a preferred embodiment of the line sensor according to the present invention.

FIG. 4 shows a preferred embodiment of the line sensor wherein conductors 11 and 14 of line transducer 10, 16, 25, or 26 are connected to the output of an oscillator 19. Conductors 11 and 14 are further connected to a demodulator 20 which is connected to an amplifier 21. Amplifier 21 is connected to a passband filter 22 which is connected to an alarm 23.

OPERATION

Line transducer 10 is responsive to the ambient magnetic field because of the magnetization of ferromagnetic coating 12. Line transducer 10 becomes operative when connected to the circuitry shown in FIG. 4. Oscillator 19 drives conductors 11 and 14 with an oscillating signal having a constant frequency and current amplitude which causes the magnetization vector of ferromagnetic coating 12 to oscillate from its predisposed position because of the alternating electromagnetic field created about conductor 11 by the oscillating signal. Variations in the ambient magnetic field will further disorient the magnetization vector in accordance with the variation in the ambient magnetic field. The resulting variation in the orientation of the magnetization vector causes a corresponding change in the inductive impedance of conductor 11. This change in the inductive impedance causes a corresponding change in the impedance of transducer 10. The varying impedance of transducer 10 results in amplitude modulation of the oscillating signal generated by oscillator 19. Demodulator 20 is employed to detect the amplitude modulation of the oscillating signal and to produce an output signal representative of that modulation. In a security application for which the preferred embodiment was designed, the output of demodulator 20 is introduced into a system such as is described by amplifier 21, passband filter 22, and alarm 23. Alarm 23 is any desired apparatus capable of indicating that an output signal from demodulator 20 is characteristic of an intruder's amplitude and frequency signature.

Line transducer 10 may also be responsive to pressure by making ferromagnetic coating 12 magnetostrictive which is achieved by slightly varying the percentage of iron and nickel in ferromagnetic coating 12 from 20 percent iron and 80 percent nickel. Pressure upon line transducer 10 causes displacement of conductor 11. Because of the magnetostrictive property of ferromagnetic coating 12, such displacement causes a disorientation of the magnetization vector. The inductive impedance of conductor 11 varies accordingly, thereby varying the impedance of line transducer 10 in correspondence with the pressure thereon. This variation in impedance is detected in the same manner as described above. The sensitivity of line transducer 10 to the ambient magnetic field can be eliminated by making conductor 14 ferromagnetic which shields conductor 11. Therefore, line transducer 10 would be sensitive only to displacement due to direct pressure thereon or indirect pressure upon the medium supporting line transducer 10.

An alternate embodiment of line transducer 10 is also depicted in FIG. 5. Conductor 11 with its ferromagnetic coating is not bound to insulating material 13 and does not respond either to direct pressure or to forces which tend to longitudinally stress line transducer 10. Conductor 11 will be subject only to bending forces imposed upon line transducer 10. As such, the strain imposed on conductor 11 will be determined by the radius of the bend or "differential displacement" of line transducer 10. In this embodiment, line transducer 10 will be responsive only to localized forces and unresponsive to uniform forces acting along the length of the transducer.

Conductor 14 acts as a shield for the electromagnetic field generated about conductor 11, thereby preventing the detection of the line transducer due to stray electromagnetic radiation. This shielding effect has particular value in security applications.

FIG. 6 shows a line transducer 25 which is an alternate embodiment of line transducer 10. Conductor 14 does not enclose conductor 11 in line transducer 25 but instead lies substantially parallel to conductor 11. The operation of line transducers 10 and 25 is identical. However, the shielding of conductor 11 by conductor 14 as described above is not present in line transducer 25.

Referring to FIGS. 3 and 5, line transducers 16 and 26 are primarily responsive to seismic movement although also responsive to pressure and to the ambient magnetic field if so desired. Line transducer 26 is identical to line transducer 10 except that conductor 11 is not tightly contained within insulating material 13, and ferromagnetic coating 12 is magnetostrictive. The inner diameter of insulating material 13 is greater than the diameter of conductor 11, thereby allowing conductor 11 freedom of movement within line transducer 26. Conductor 11 in line transducer 26 is a very small diameter wire which has a tendency to coil. Therefore, as shown in FIG. 5, conductor 11 comes into contact with insulating material 13 only at various points along the length of line transducer 26, thereby leaving intervals of noncontact. Seismic movement causes a strain in conductor 11 due to the bending stress caused by the movement of the distributed weight of conductor 11 along the intervals of noncontact with insulating material 13. This makes line transducer 26 sensitive to seismic movement. The displacement of line transducer 26 is sensed in the same manner as described for line transducer 10.

Line transducer 16 shown in FIG. 3 is similar to line transducer 26 except that insulating material 13 is replaced by a plurality of circular spacers 17 to prevent contact between conductors 11 and 14 and to allow conductor 11 some degree of movement. When line transducer 16 is subjected to an acceleration or vibration, masses 18 cause conductor 11 to be stretched between spacers 17. The resulting strain of conductor 11 is detected in the same manner as described in the operation of line transducer 10. As stated before, the sensitivity of line transducers 16 and 26 to magnetic disturbances can be eliminated by making conductor 14 ferromagnetic.

The variations in inductive impedance of conductor 11 could be detected through frequency modulation as opposed to amplitude modulation by making the line transducer part of the frequency determining circuitry of oscillator 19.

Although line transducers 10, 16, 25, and 26 function properly as open ended transmission lines, improved results may be obtained by connecting conductors 11 and 14 of the line transducers at one end thereby making each of the above line transducers function as close-ended transmission lines. Whether an open or close-ended transmission line is desired for optimum performance depends upon the oscillating signal frequency and the length of the line transducer.

As has been described, the line sensor can be sensitive to magnetic, pressure and seismic disturbances, to differential displacement, to any combination of the influences, or all simultaneously if so desired. The line transducer of the line sensor can either be buried within some medium such as the earth or attached to the surface of that medium for sensing magnetic disturbances in the ambient magnetic field or for sensing pressure upon or seismic movement of that medium. The description contained within this specification is preferred and is not intended to limit the scope and intent of the present invention.

I claim as my invention:

1. A line sensor for indicating at least one of a disturbance in the ambient magnetic field, a pressure exerted thereon, a vibration imposed thereon, and physical displacement of a portion thereof comprising:
   a wire-like first conductor having a ferromagnetic coating thereon, said coating have a predisposed net magnetization vector and further being magnetostrictive;
   an insulating means enclosing said coated first conductor, said insulating means having internal dimensions substantially exceeding the dimensions of said coated first conductor, such that said coated first conductor is free to move with respect to said insulating means;
   a second conductor which in combination with said first conductor forms a transmission line having a characteristic impedance;
   an oscillator for producing an output signal at a pair of output terminals;
   means connecting said output terminals to said first and second conductors; and
   monitoring means connected to said first and second conductors for sensing distortion of said output signal due to fluctuations in the impedance of said first and second conductors that are caused by disturbances in the orientation of said magnetization vector in response to strain imposed upon said first conductor because of at least one of pressure, vibration, and displacement imposed thereon and a disturbance in the ambient magnetic field.

2. The line sensor of claim 1 wherein said second conductor encloses the length of said first conductor.

3. The line sensor of claim 2 wherein said second conductor is a ferromagnetic material.

4. The line sensor of claim 3 wherein said monitoring means comprises:
   a demodulator connected to said first and second conductors for detecting amplitude modulation of said output signal due to said fluctuations in said impedance, said demodulator producing a representative signal of said modulation;
   an amplifier connected to said demodulator to receive said representative signal;
   a filter network connected to said amplifier for passing only said representative signals within a desired frequency band; and
   an alarm connected to said filter network, said alarm being responsive to said representative signals passed by said filter network.

5. The line sensor of claim 4 and a protective covering enclosing said second conductor.

6. The line sensor of claim 2 wherein said insulating means supports said first conductor with its ferromagnetic coating at a plurality of predetermined points along the length of said first conductor thereby leaving predetermined intervals of noncontact between said predetermined points such that said first conductor with its ferromagnetic coating is free to move within said intervals independent of said insulating means.

7. The line sensor of claim 6 and a plurality of masses attached to the ferromagnetic coating of said first conductor, wherein one of said plurality of masses is attached at each said interval between said points of contact with said insulating means.

8. The line sensor of claim 7 wherein said second conductor is a ferromagnetic material.

9. The line sensor of claim 8 wherein said monitoring means comprises:
   a demodulator connected to said first and second conductors for detecting amplitude modulation of said output signal due to said fluctuations in said impedance, said demodulator producing a representative signal of said modulation;
   an amplifier connected to said demodulator to receive said representative signal;
   a filter network connected to said amplifier for passing only said representative signals within a desired frequency band; and
   an alarm connected to said filter network, said alarm being responsive to said representative signals passed by said filter network.

10. The line sensor of claim 9 and a protective covering enclosing said second conductor.

* * * * *